United States Patent
Park et al.

(10) Patent No.: US 6,611,483 B1
(45) Date of Patent: Aug. 26, 2003

(54) DEVICE AND METHOD FOR RECORDING DATA ON OPTICAL RECORDING MEDIUM

(75) Inventors: Yong Cheol Park, Kyonggi-do (KR); Kyu Hwa Jeong, Seoul (KR); Jong In Shin, Kyonggi-do (KR); Han Sang Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 315 days.

(21) Appl. No.: 09/707,943

(22) Filed: Nov. 8, 2000

(30) Foreign Application Priority Data

Nov. 16, 1999 (KR) ........................... 1999-50890

(51) Int. Cl.$^7$ ............................... G11B 7/00
(52) U.S. Cl. .................. 369/53.21; 369/53.15
(58) Field of Search ............... 369/53.12, 53.15, 369/53.17, 53.21, 275.3

(56) References Cited

U.S. PATENT DOCUMENTS 5,878,020 A * 3/1999 Takahashi ............... 369/59.25

* cited by examiner

*Primary Examiner*—Nabil Hindi
(74) *Attorney, Agent, or Firm*—Birch, Stewart, Kolasch & Birch, LLP

(57) ABSTRACT

Device and method for recording a data on an optical recording medium, the device including a controller for transmitting a data to be written, if the data to be written is produced, together with a control signal, determining that a data in a block of the sector the data to be written is valid if the data to be written is a sector unit data, marking a result of the determination as identification information in the control signal, and transmitting the identification information, and a data writing part for identifying the identification information in the control signal from the controller, and writing the data from the controller in the sector designated by the control signal directly, if the identification information indicates that the data in the block having the sector the data to be written therein is not valid, thereby reducing data writing failure caused by failure of reading data in sectors in a block other than the sector the data to be written therein, and enhancing a system performance in writing.

15 Claims, 6 Drawing Sheets

FIG.3
Related Art optical disk recording/reproducing device

FIG.4
Related Art

| byte | bit | 7 | 6 | 5 | 4 | 3 | 2 | 1 | 0 |
|---|---|---|---|---|---|---|---|---|---|
| 0 | | \multicolumn{8}{l|}{Operation code(AAh)} |
| 1 | | \multicolumn{3}{l|}{LUN(obsolute)} | DPO(0) | FUA | EBP | Reserved | RelAdr |
| 2 | | MSB | | | | | | | |
| 3 | | \multicolumn{8}{l|}{Logical Block Address} |
| 4 | | \multicolumn{8}{l|}{or Logical Sector Address} |
| 5 | | | | | | | | | LSB |
| 6 | | MSB | | | | | | | |
| 7 | | \multicolumn{8}{l|}{Transfer Length} |
| 8 | | | | | | | | | |
| 9 | | | | | | | | | LSB |
| 10 | | \multicolumn{8}{l|}{Reserved} |
| 11 | | Vender–Specific | | | Reserved | | | Flag | Link |

FIG.5

| byte | bit | 7 | 6 | 5 | 4 | 3 | 2 | 1 | 0 |
|---|---|---|---|---|---|---|---|---|---|
| 0 | | Operation code(AAh) | | | | | | | |
| 1 | | LUN(obsolute) | | | DPO(0) | FUA | EBP | FDR | RelAdr |
| 2 | | MSB | | | | | | | |
| 3 | | | | | Logical Block Address | | | | |
| 4 | | | | | or Logical Sector Address | | | | |
| 5 | | | | | | | | | LSB |
| 6 | | MSB | | | | | | | |
| 7 | | | | | Transfer Length | | | | |
| 8 | | | | | | | | | |
| 9 | | | | | | | | | LSB |
| 10 | | Reserved | | | | | | | |
| 11 | | Vender-Specific | | | Reserved | | | Flag | Link |

FIG.6

DEVICE AND METHOD FOR RECORDING DATA ON OPTICAL RECORDING MEDIUM

BACKGROUND OF THE INVENTION

1. Field of the Invention

The present invention relates to a rewritable optical recording medium system, and more particularly, to device and method for recording data on a rewritable optical recording medium.

2. Background of the Related Art

Figure 1:
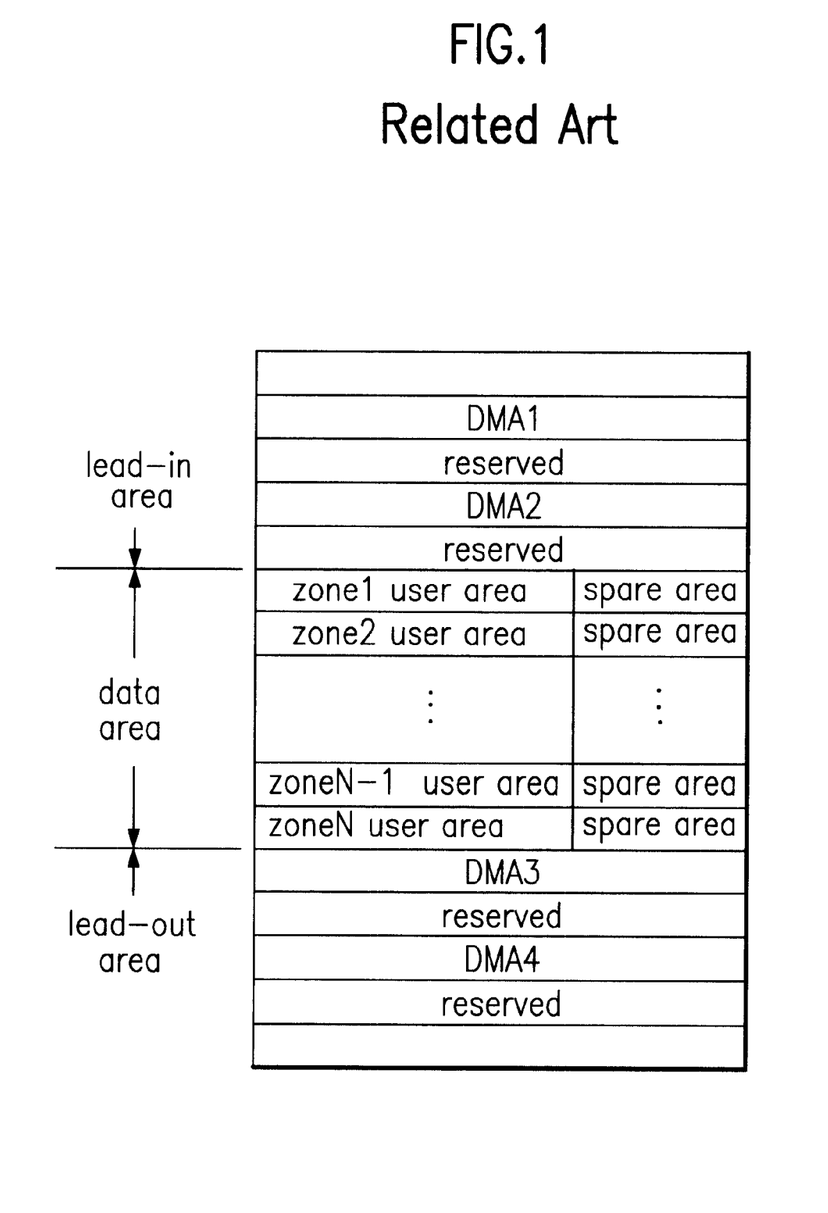
FIG. 1 illustrates an architecture of a related art optical disk.

In general, there are rewritable compact disc(CD-RW) and rewritable digital versatile disc(DVD-RW, DVD-RAM, DVD+RW) in optical recording mediums, particularly, in optical disks, which are rewritable freely and repetitively. In those rewritable optical disks, information writing/reading thereto/therefrom are made repetitively as the nature of use of the optical disk is. The repetitive write/read of information causes a change of a mixing ratio of a recording layer mixture provided for recording the information from an initial mixing ratio, which leads to lose initial properties of the mixture, that causes an error occurred in writing/reading information, which is called degradation. Areas of the degradation are turned up as defective areas when formatting, or write or read command for the optical disk is carried out. Other than the degradation, defective areas on the rewritable optical disk are caused by scratch on a surface, dusts, and/or from production defects. Therefore, in order to prevent writing/reading data to/from the defective areas formed by the foregoing causes, management of the defective areas is required. To do this, as shown in FIG. 1, DMAs(Defect Management Areas) are provided in lead-in areas and in lead-out areas of the optical recording medium for managing the defective areas on the optical recording medium. And, data areas are managed in zones, each having a user area for use in actual writing of data and a spare area for use in a case of defect occurrence in the user area. Or alternatively, the spare area may be assigned to a portion of the data area, i.e., to top or bottom. In general, there are four DMAs provided in one disk(for example, a DVD-RAM), two in the lead-in area and the other two in the lead-out area. As management of the DMAs are important, the same data is repeatedly written in the four DMAs for protection of data. Each DMA has two blocks having 32 sectors in total, i.e., one block has 16 sectors. A first block of each DMA(called as DDS/PDL block) includes a DDS(Disk Definition Structure) and a PDL(Primary Defect List), and a second block(called as SDL block) of each DMA includes an SDL(Secondary Defect List). The PDL is a primary defective data storage portion and the SDL is a secondary defective data storage portion. In general, the PDL is in storage of entries of defects occurred in a disk fabrication process and all defective sectors identified in formatting, i.e., initializing and re-initializing, of the disk. Each entry has an entry type and a sector number corresponding to a defective sector. On the other hand, the SDL, listed in block units, is in storage of entries of defective areas occurred after the formatting, or defective areas which can not be stored in the PDL during the formatting. Each SDL entry has one area in storage of a sector number of a first sector in a block having a defective sector occurred therein and the other area in storage of a sector number of a first sector in a spare block which will replace the defective block. The defective areas(i.e., defective sectors or defective blocks) in the data area are replaced with good areas, according to a slipping replacement algorithm or linear replacement algorithm.

Figure 2A:
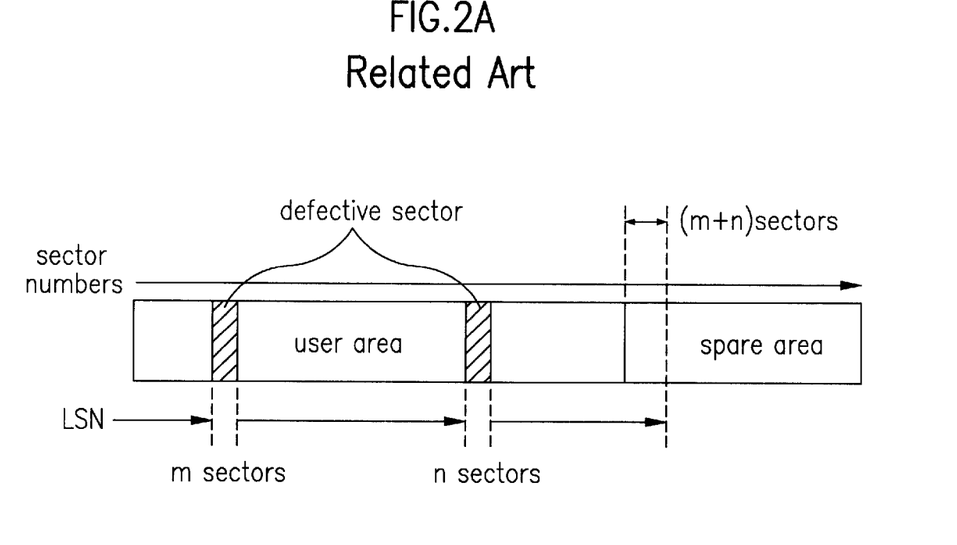
FIG. 2A illustrates a related art slipping replacement.

Referring to FIG. 2A, in the slipping replacement which is applicable to a case when a defective area is listed on the PDL, if the defective sector listed on the PDL is present in the user area on which an actual data is to be written, the defective sector is skipped, and instead, the defective sector is replaced with a good sector next to the defective sector in writing a data. Consequently, the user area on which the data is being written is pushed backward, to occupy the spare area as much as the skipped defective sector, at the end.

Figure 2B:
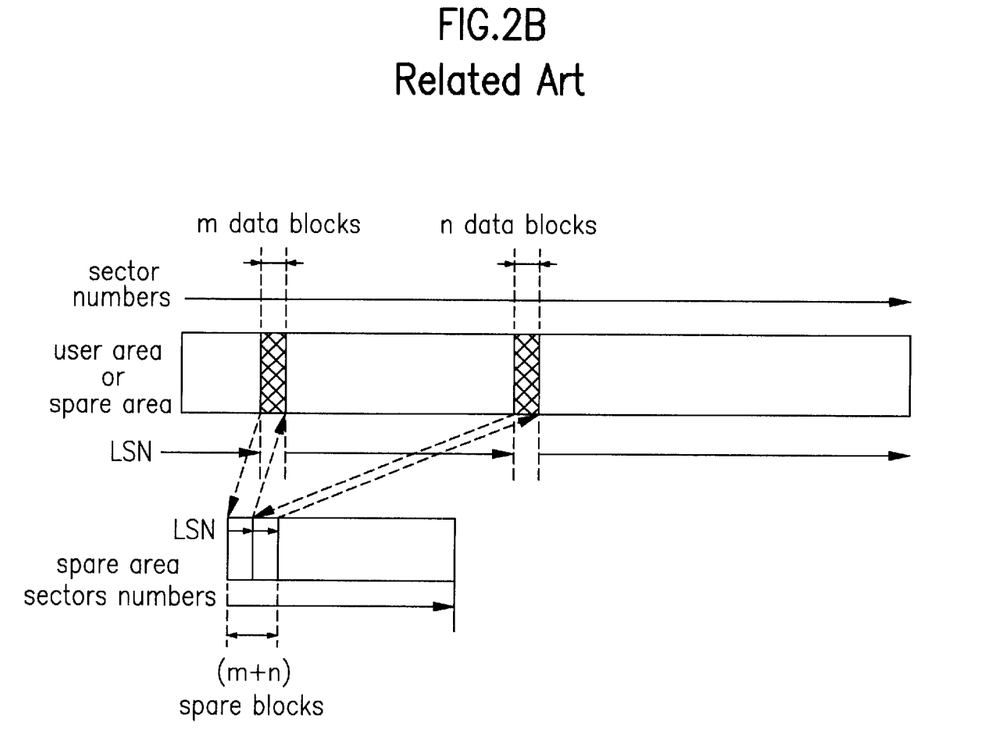
FIG. 2B illustrates a related art linear replacement.

And, referring to FIG. 2B, in the linear replacement which is applicable to a case when a defective area is listed on the SDL, if there is a defective block listed on the SDL present in the user area or in the spare area, the defective block is replaced with block units of replacement areas assigned to the spare area in writing the data. In this instance, though a PSN(Physical Sector Number) assigned to the defective block is not changed, an LSN(Logical Sector Number) is transferred to the replacement block, together with the data. This linear replacement is effective in non-realtime writing/reading a data.

Figure 3:
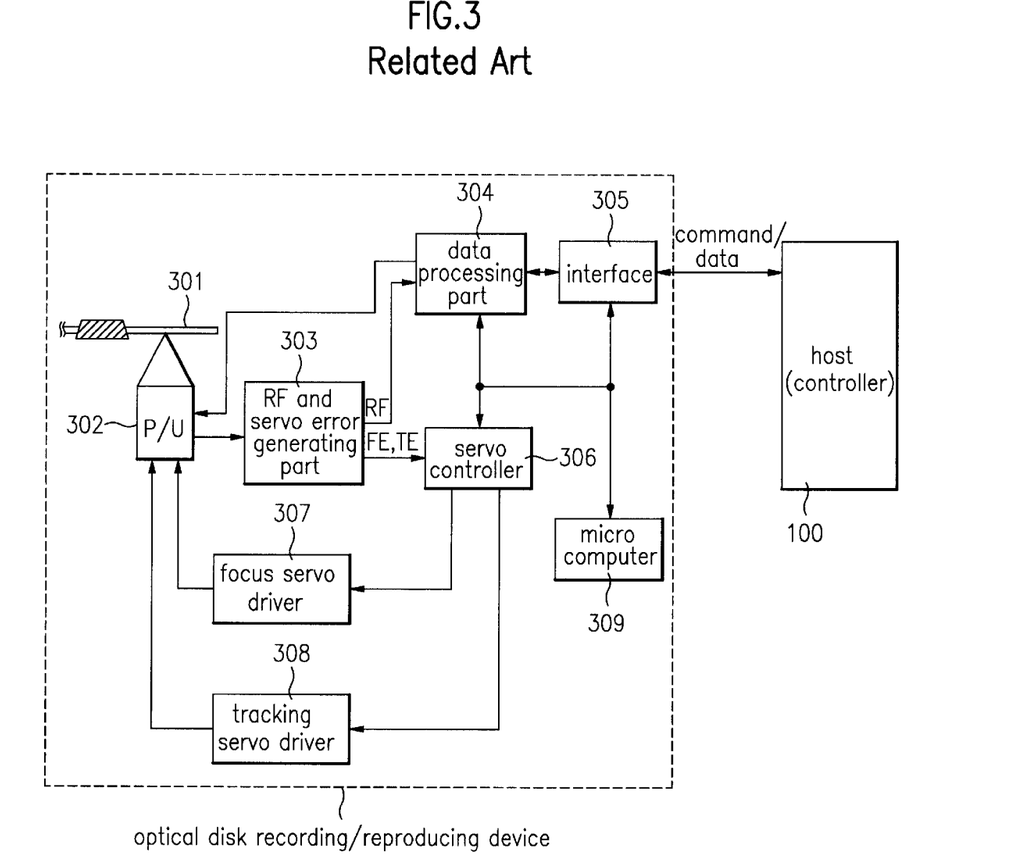
FIG. 3 illustrates a block diagram showing one example of a related art optical disk recording/reproducing device.

FIG. 3 illustrates a block diagram showing one example of a related art rewritable optical recording disk recording/reproduction device, provided with an optical disk 301, an optical pickup 302, a RF and servo error generating part 303, a data processing part 304, an interface 305, a servo controller 306, a focus servo driver 307, a tracking servo driver 308, and a microcomputer 309 for controlling the above components. There is a host 100 connected to the interface 305 of the optical disk recording/reproducing medium for exchange of commands and data. In this instance, the host 100, one of PC(Personal Computer), supports the optical disk recording/reproducing device.

A signal track of the foregoing optical disk 301 in FIG. 3 has a land and a groove, wherein data can be recorded/reproduce, not only on the land or in the groove, but also on both of the land and the groove. In this instance, under the control of the servo controller 306, the optical pick up directs an optical beam focused by an objective lens to the signal track of the optical disk 301, and an optical beam reflected at a signal recording surface to an optical detector (not shown) for detecting a focus error and a tracking error after focusing the optical beam to the objective lens, again. The optical detector has a plurality of optical detecting elements, each for providing an electric signal proportional to an amount of light incident thereto to the RF and servo error generating part 303, which combines the electric signals to produce a RF signal required for reproduction of a data, and a tracking error signal TE and a focus error signal FE, both required for servo control, and the like. The RF signal is provided to the data processing part 304 for reproduction, and servo error signals, such as FE and TE, are provided to the servo controller 306. The data processing part 304 encodes a data to be written into a recording pulses required by the optical disk 301 and provides to the optical pickup 302, or restores the RF signal into an original data. The servo controller 306 processes the focus error signal FE to provide a driving signal to the focus servo driver 307, and processes the tracking error signal TE to provide a driving signal to the tracking servo driver 308 for tracking control. The focus servo driver 307 drives a focus actuator in the optical pickup to move the optical pickup in up and down directions, for following up the optical disk as the optical disk turns. The tracking servo driver 308. The tracking servo driver 308 drives a tracking actuator in the optical pickup 302 to move the optical pickup 302 in a radial direction, for correcting a position of the beam, to follow up a required track. In the meantime, the host 100 transfers recording/ reproduction command to the microcomputer 309 through the interface 305, data to be written to the data processing part 304, and receives a reproduced data. The microcomputer 309 controls the data processing part 304, the interface 305 and the servo controller 306 in response to the write/ read command from the host. That is, provided that a data to be written is occurred, the host 100 transfers the data to be written to the optical disk recording/reproducing device, together with a write command. The data to be written may be an A/V data(for example, a movie and the like) requiring a real time recording, or a PC data(for example, a control data or a document file)requiring no real time recording.

Figure 4:
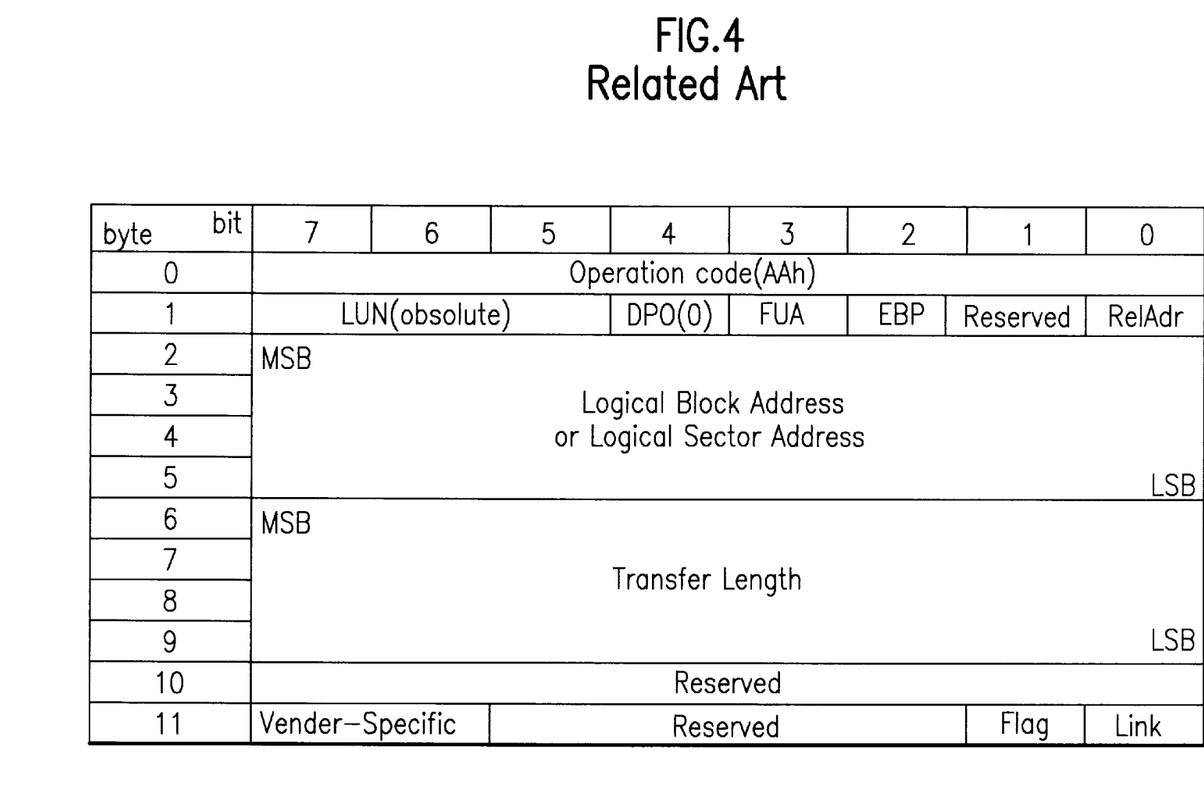
FIG. 4 illustrates an example of a related art write command format.

FIG. 4 illustrates an example of a related art write command format. The data to be written of being the PC data or the A/V data may be informed to the optical disk recording/reproducing device either by using a write command, or by means of a separate agreement between the host and the optical disk recording/reproducing device. In this instance, the A/V data is written in block units, and the PC data is written in block units or in sector units, which is designated in the write command. The optical disk recording/reproducing device writes the data through a RMW(Read-Modify-Write) process if the data to be written is the PC data in sector units, without fail. That is, a block in which a sector the PC data is to be written therein is read, to check an error, for writing the data in the sector if there is no error in the sector, or after the error is corrected if the error can be corrected. The error correction is carried out in block units. If there is an error in the block, but impossible to correct, or the block is not read at all, no data is written in the block. That is, the data writing is failed. In this instance, after making an error report to the host 100, the optical disk recording/reproducing device writes the data again through the above process after receiving another area assigned by the host 110, or makes a linear replacement to the spare area. On the other hand, the optical disk recording/ reproducing device writes the data with, or without the RMW process, i.e., without verification, if the data to be written is the PC data in block units. In this instance, the optical disk recording/reproducing device writes no data in areas with defects by using the PDL and the SDL, which is information indicating defective optical disk. That is, physical sectors recorded on the PDL is skipped in the writing, and physical blocks recorded on the SDL are replaced with replacement blocks assigned to the spare area in writing. The optical disk recording/reproducing device writes the data in the assigned block directly without the RMW process, if the data to be written is the A/V data. Therefore, the data is written in a defective sector included in the assigned block as it is. That is, in this instance too, though the physical sectors recorded on the PDL are skipped in the writing, the physical blocks registered on the SDL are either skipped or have data written thereon as they are. And, though not registered on the SDL, a block having an error in a PID (Physical Identification) which indicates a sector address is taken as a defective block and registers on the SDL, either to skip the block or have data written thereon.

In the meantime, when it is intended to rewrite a PC data on a particular sector in a block having a data written therein directly without the RMW process, the particular sector is subjected to the RMW process, which increases a probability of occurrence of a writing failure of the PC data, particularly, when the PC data is to be written in a particular sector in a block having an A/V data written thereon. And, an error processing, such as this data writing failure, causes a case when no data is written on a sector a data is required to be written therein without fail.

SUMMARY OF THE INVENTION

Accordingly, the present invention is directed to device and method for recording data on an optical recording medium that substantially obviates one or more of the problems due to limitations and disadvantages of the related art.

An object of the present invention is to provide device and method for recording data on an optical recording medium, which can reduce data writing failures.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method for recording a data on an optical recording medium includes the steps of (a) if a data to be written in sector units is produced, determining a validity of a data in a block having the sector included therein, and marking, and transmitting a result of the determination as an identification information in a control signal, and (b) identifying the identification information in a control signal transmitted in the step (a), and directly writing the data in the sector of the optical recording medium designated by the control signal if the marking indicates that the data in the block of the sector having the data to be written is not valid.

The control signal transmitted in the step (a) is a write command, wherein an unused area of the write command has an area for identification information assigned thereto, the area for identification information having a mark indicating a validity of the data in a block of the sector the data is to be written therein.

A file system for managing file information is used in the determination of validity of the data in the block having the sector the data is to be written therein in the step (a).

The writing step further includes the step of padding '0' on rest of sectors except a sector in the block the data is to be written therein if the identification information in the transmitted control signal indicates that the data in the block having the sector the data is to be written therein is not valid.

The writing step further includes the step of writing the data in the sector through a RMW process if the identification information in the transmitted control signal indicates that the data in the block having the sector the data is to be written therein is valid.

In another aspect of the present invention, there is provided a device for recording a data on an optical recording medium including a controller for transmitting a data to be written, if the data to be written is produced, together with a control signal, determining that a data in a block of the sector the data to be written is valid if the data to be written is a sector unit data, marking a result of the determination as identification information in the control signal, and transmitting the identification information, and a data writing part for identifying the identification information in the control signal from the controller, and writing the data from the controller in the sector designated by the control signal directly, if the identification information indicates that the data in the block having the sector the data to be written therein is not valid.

The control signal from the controller is a write command, wherein an unused area of the write command has an area for identification information assigned thereto, the area for identification information having a mark indicating a validity of the data in a block of the sector the data is to be written therein.

The controller determines a validity of the data in the block having the sector the data is to be written therein by using a file system for managing file information.

If the data in the block having the sector the data to be written therein is a real time data of which writing/reading is carried out in block units, the controller determines that the data in the block is not valid.

The data writing part pads '0' on rest of sectors except the sector in the block the data is to be written therein if the identification information in the transmitted control signal indicates that the data in the block having the sector the data is to be written therein is not valid.

The data writing part writes the data in the sector through a RMW process if the identification information in the transmitted control signal indicates that the data in the block having the sector the data is to be written therein is valid.

Thus, according to the device and method for recording data on a rewritable optical recording medium of the present invention, in a case a data is required to be written in sector units, the host determines if data in other sectors in a block of the sector is valid, and transmits a result of the determination marked as an identification information in a write command. Then, the optical disk recording/reproducing device identifies the identification information in the write command, to write the data from the host in the sector without condition without passing through a RMW process if it is marked that the data in other sectors in the block of the sector having the data to be written therein is not valid, or to write the data from the host in the sector passing through a RMW process if it is marked that the data in other sectors in the block of the sector having the data to be written therein is valid. Therefore, the failure of data writing caused by reading failure of data in other sectors in a block of the sector the data is to be written therein can be reduced and a system performance can be enhanced.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 5:
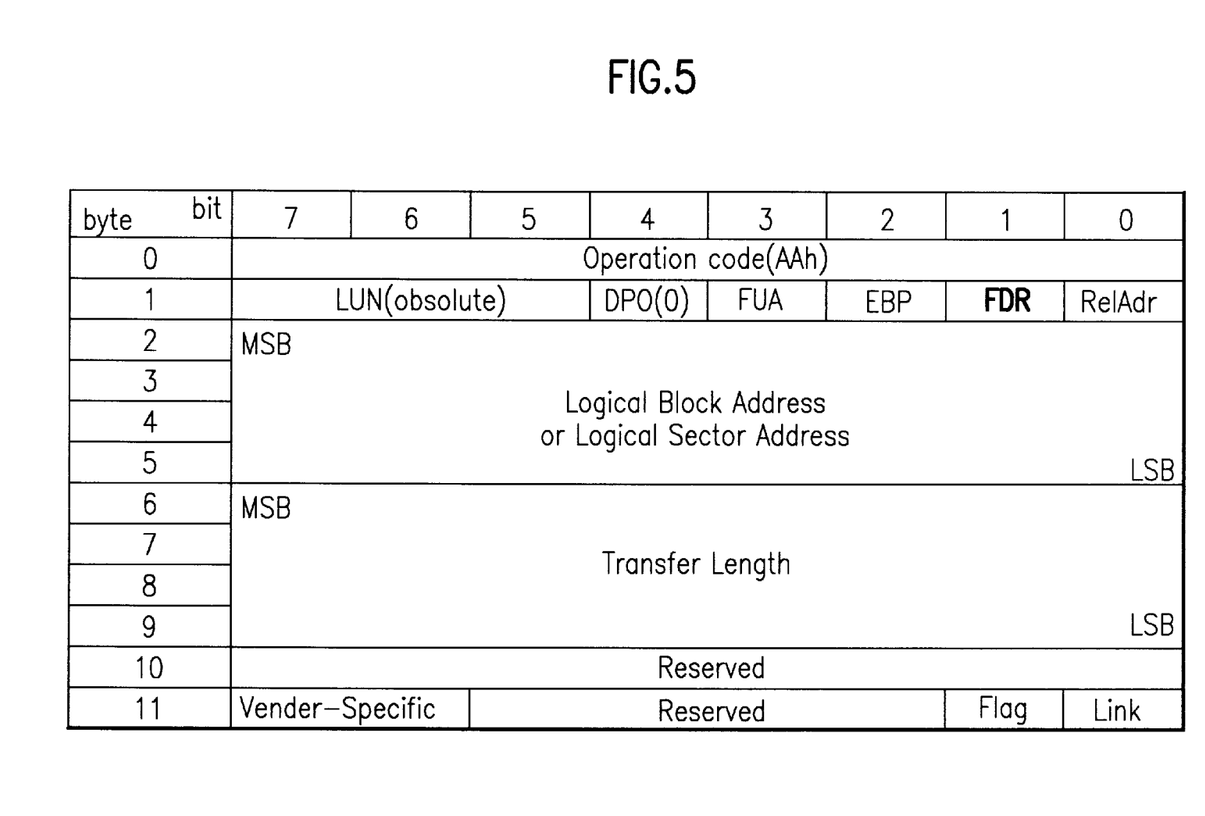
FIG. 5 illustrates an example of a write command format in accordance with a preferred embodiment of the present invention; and, FIG. 6 illustrates a flow chart showing the steps of a method for writing a data on an optical recording/reproducing device in accordance with a preferred embodiment of the present invention.

Reference will now be made in detail to the preferred embodiments of the present invention, examples of which are illustrated in the accompanying drawings. FIG. 5 illustrates modification of a portion of an existing write command to be transmitted from a host for data writing according to the present invention. For keeping interchangeability with an existing write command system, a flag is provided to the existing write command system for identification, which is called as FDR(Force Data Record) flag in the present invention for convenience of explanation. The FDR flag is provided to a reserved area of the write command, for example, to a first bit of a first byte in FIG. 5. FIG. 5 illustrates only one example, and it does not matters if it is any reserved area within the write command. That is, if the data is to be written in sector units, the host 100 marks validity of data in other sectors in the same block having the above sector included thereto on the FDR flag in transmission of the write command.

Figure 6:
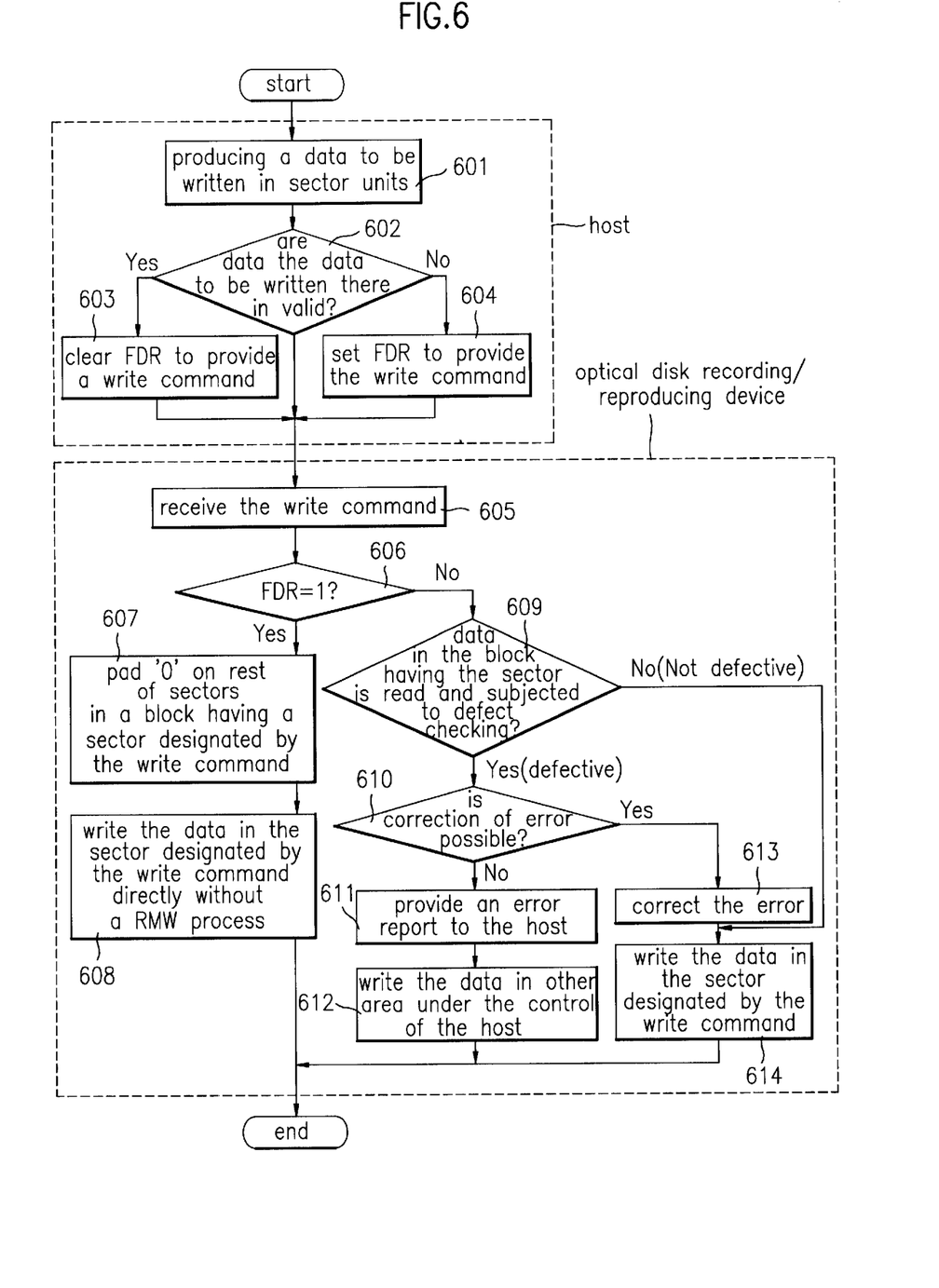

FIG. 6 illustrates a flow chart showing the steps of a method for writing a data on an optical recording/reproducing device in accordance with a preferred embodiment of the present invention.

Upon occurrence of data to be written in sector units(step 601), the host 100 determines validity of data in other sectors of the block having the data to be written(step 602). The validity of the data can be determined in a variety of methods, and in the present invention, for example, the file system is employed for determining the validity of the data. That is, presence of data in the sector can be determined with reference to a spare bit map of the file system. For example, if a spare bit of the sector is '0', it represents that there is no data recorded in the sector, and if a spare bit of the sector is '1', it represents that there is a data recorded in the sector. If a file is erased, a file system is marked that there is no data in the file though there is data actually. That is, when the file is erased, the file system changes sectors which indicates that there is a data recorded in the file from '1' to '0'. In this instance, the block having a sector a new data is to be written therein may, or may not have a data already written which may be a PC data or an A/V data. If the data written already therein is the PC data, though only the new data may be written in sector units, since the necessity for conversation of the already written data is strong, the new data may be written in the sector while the already written data is encoded in block units maintaining the already written data in the block as it is. However, because the A/V data is written/read by block units, the A/V data and the PC data can not be mixed in one block. Therefore, in order to write the PC data in a particular sector in a block having the A/V data written therein, the A/V data written already in the same block is required to be determined as being invalid. In this instance, the file system may be marked that all the sectors in the block having the A/V data written therein have no data written therein. Thus, when it is intended to write the data in sector units, the host 100 may be known or determine a validity of the data in other sectors in the block than the sector included therein by using the file system for itself. That is, once the host 100 is known that the data already written in the block of the sector a data to be written therein is the A/V data, the host 100 can determine that the data in the block is not valid even if the file system is not referred to. Once a data in other sector in the block of the sector the data to be written therein is determined to be valid according to the foregoing process, the FDR flag is reset to '0' to provide the write command.(step 603). And, once the data in other sector in the block of the sector the data to be written therein is determined to be invalid according to the foregoing process, the FDR flag is set to '1' to provide the write command.(step 604).

On the other hand, the optical disk recording/reproducing device receives the write command from the host 100(step 605), and determines the FDR flag of being set to '1'(step 606). If it is determined in the step 606 that the FDR flag is set to '1', '0' is padded on other sectors in the block of the sector a data designated by the write command is to be written therein(step 607). Then, a padded value and the data of the sector the data to be written therein are ECC encoded and written in block units(step 608). As a result, a desired data can be written in the sector designated by the write command without the RMW process. That is, if the FDR flag is set to '1', it means that the data is forced to written regardless of defect. Therefore, if the FDR flag is set to '1', no error report is provided to the host. If the FDR flag is thus set to '1', taking that '0' is written in other sectors in the block of the sector, no data in the block is read, but a data from the host is only written in the sector by ECC encoding. Processing thereafter is made to be done by the optical disk recording/reproducing device for itself. As an example, after the data is written in the sector according to the foregoing precess, if a block of the sector is read to find no error or the error is corrected, if the error can be corrected, and if the block is not read, or the error can not be corrected, the linear replacement or the like can be carried out.

In the meantime, if it is determined in the step 606 that the FDR flag is set to '0', the data is written through the RMW process the same as in the related art. That is, since the data in the block of the sector is valid, as padding of '0' or the like should be avoided, the data in the block is read at first, and presence of defect of the block is determined(step 609). If the data in the block is not read, the data is determined to be defective, and an error correction possibility is checked(step 610). In this instance, if it is determined in the step 610 that, through there is an error in the data, the error can be corrected, the error is corrected(step 613) and the data is written in the sector designated by the write command(step 614). And, if it is determined in the step 609 that there is no defect in the data, in this instance too, the data is written in the sector designated by the write command(step 614). On the other hand, if it is determined in the step 610 that the correction of error is not possible, the data writing in the sector is failed. In this instance, an error report is provided to the host 100(step 611). Then, either the data is written again in an area designated by the host 100 newly through the foregoing process, or a linear replacement to the spare area is carried out(step 612).

Thus, the device and method for recording data on a rewritable optical recording medium of the present invention can be applied to a case when a data is required to be written in sector unit regardless that either a PC data or an A/V data is written in a block of the sector. Particularly, the device and method for recording data on a rewritable optical recording medium of the present invention is effective to a case the PC data is written in a particular sector in a block having the A/V data already written therein.

As has been explained, according to the device and method for recording data on a rewritable optical recording medium of the present invention, in a case a data is required to be written in sector units, the host determines if data in other sectors in a block of the sector is valid, and transmits a result of the determination marked as an identification information in a write command. Then, the optical disk recording/reproducing device identifies the identification information in the write command, to write the data from the host in the sector without condition without passing through a RMW process if it is marked that the data in other sectors in the block of the sector having the data to be written therein is not valid, or to write the data from the host in the sector passing through a RMW process if it is marked that the data in other sectors in the block of the sector having the data to be written therein is valid. Therefore, the failure of data writing caused by reading failure of data in other sectors in a block of the sector the data to be written therein can be reduced and a system performance can be enhanced.

It will be apparent to those skilled in the art that various modifications and variations can be made in the device and method for recording data on a rewritable optical recording medium of the present invention without departing from the spirit or scope of the invention. Thus, it is intended that the present invention cover the modifications and variations of this invention provided they come within the scope of the appended claims and their equivalents.

What is claimed is:

1. A method for recording a data on an optical recording medium, comprising the steps of:
   (a) if a data to be written in sector units is produced, determining a validity of a data in a block having the sector included therein, and marking, and transmitting a result of the determination as an identification information in a control signal, the identification information comprising a force data record (FDR) flag; and,
   (b) identifying the identification information in a control signal transmitted in the step (a), and directly writing the data in the sector of the optical recording medium designated by the control signal if the marking indicates that the data in the block of the sector having the data to be written is not valid.

2. A method as claimed in claim 1, wherein the control signal transmitted in the step (a) is a write command, wherein an unused area of the write command has an area for identification information assigned thereto, the area for identification information having a mark indicating a validity of the data in a block of the sector the data is to be written therein.

3. A method as claimed in claim 1, wherein a file system for managing file information is used in the determination of validity of the data in the block having the sector data is to be written therein in the step (a).

4. A method as claimed in claim 1, wherein the writing step further comprising the step of padding '0' on rest of sectors except a sector in the block the data is to be written therein if the identification information in the transmitted control signal indicates that the data in the block having the sector the data is to be written therein is not valid.

5. A method as claimed in claim 1, wherein the writing step further comprising the step of writing the data in the sector through a RMW process if the identification information in the transmitted control signal indicates that the data in the block having the sector the data is to be written therein is valid.

6. A method as claimed in claim 5, wherein the step (b) includes the steps of;
   (a) if the identification information in the transmitted control signal indicates that the data in the block having the sector the data is to be written therein is valid, reading the data in the block and determining a defect,
   (b) if the data is determined defective in the step (a), determining whether an error can be corrected or not, to correct the error if correction of the error is possible, and writing a transmitted data in the sector designated by the control signal, and (c) if the data is determined not defective in the step (a), and writing the transmitted data in the sector designated by the control signal.

7. A device for recording a data on an optical recording medium comprising:

a controller for transmitting a data to be written, if the data to be written is produced, together with a control signal, determining that a data in a block of the sector the data to be written is valid if the data to be written is a sector unit data, marking a result of the determination as identification information in the control signal, the identification information comprising a force data record (FDR) flag, and transmitting the identification information; and, a data writing part for identifying the identification information in the control signal from the controller, and writing the data from the controller in the sector designated by the control signal directly, if the identification information indicates that the data in the block having the sector the data to be written therein is not valid.

8. A device as claimed in claim 7, wherein the control signal from the controller is a write command, wherein an unused area of the write command has an area for identification information assigned thereto, the area for identification information having a mark indicating a validity of the data in a block of the sector the data is to be written therein.

9. A device as claimed in claim 7, wherein the controller determines a validity of the data in the block having the sector the data is to be written therein by using a file system for managing file information.

10. A device as claimed in claim 7, wherein, if the data in the block having the sector the data to be written therein is a real time data of which writing/reading is carried out in block units, the controller determines that the data in the block is not valid.

11. A device as claimed in claim 7, wherein the data writing part pads '0' on rest of sectors except the sector in the block the data is to be written therein if the identification information in the transmitted control signal indicates that the data in the block having the sector the data is to be written therein is not valid.

12. A device as claimed in claim 7, wherein the data writing part writes the data in the sector through a RMW process if the identification information in the transmitted control signal indicates that the data in the block having the sector the data is to be written therein is valid.

13. A device as claimed in claim 12, wherein, if the identification information in the transmitted control signal indicates that the data in the block having the sector the data is to be written therein is valid, the data writing part reads the data in the block and determining presence of a defect, if the data is determined defective, determines whether an error can be corrected or not, to correct the error if correction of the error is possible, and writes the data from the controller in the sector designated by the control signal.

14. A device as claimed in claim 13, wherein the data writing part provides an error report to the controller if the correction of error is not possible.

15. A device as claimed in claim 13, wherein, if the identification information in the control signal transmitted from the controller indicates that the data in the block having the sector the data to be written therein is valid, the data writing part reads the data in the block, determines presence of defects in the data, writes the data transmitted from the controller in a sector the control signal designates.

* * * * *